INVENTORS
George Hohwart,
Ernest F. Hohwart.
BY
Harness, Dickey & Pierce
ATTORNEYS.

Aug. 2, 1955

G. HOHWART ET AL 2,714,514

INTERNAL DIAPHRAGM CHUCK

Filed March 8, 1954

INVENTORS.
George Hohwart,
Ernest F. Hohwart,
BY
Harness, Dickey & Pierce
ATTORNEYS.

United States Patent Office 2,714,514
Patented Aug. 2, 1955

2,714,514

INTERNAL DIAPHRAGM CHUCK

George Hohwart, Farmington Township, Oakland County, and Ernest F. Hohwart, Detroit, Mich., assignors to N. A. Woodworth Company, Ferndale, Mich., a corporation of Michigan Application March 8, 1954, Serial No. 414,792

8 Claims. (Cl. 279—1)

This invention relates broadly to new and useful improvements in diaphragm chucks and more particularly to an internal diaphragm chuck, i. e., a chuck adapted to engage and clamp a workpiece internally.

An important object of the present invention is to provide a diaphragm chuck that is uniquely constructed to engage a workpiece internally and that automatically pulls the workpiece back against fixed locating stops when in the work-clamping position.

Another object of the invention is to provide a diaphragm chuck of the above-mentioned character that is uniquely constructed to permit ready interchangeability of diaphragm assemblies so that the chuck can be easily and quickly adapted for different types and sizes of workpieces.

Still another object of the invention is to provide a diaphragm chuck that is relatively simple in construction, efficient in operation, and inexpensive to manufacture.

Other objects and advantages of the invention will be apparent during the course of the following description.

In the drawings forming a part of this specification and wherein like numerals are employed to designate like parts throughout the same:

Figure 1:
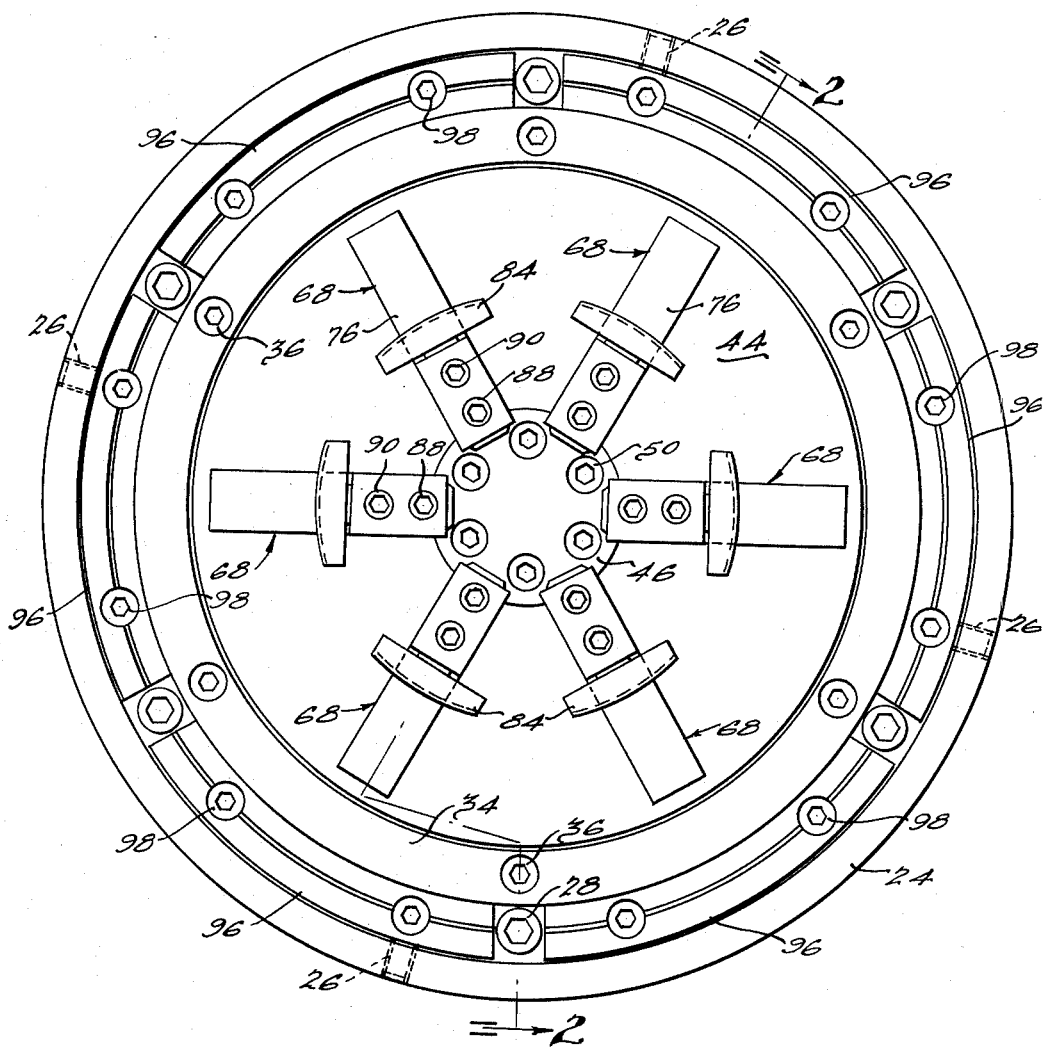
Fig. 1 is a front elevational view of a chuck embodying the invention.

In the drawings, wherein for the purpose of illustration is shown a preferred embodiment of the invention, the numeral 10 designates an annular adapter plate which carries the chuck embodying the instant invention and is adapted for attachment to the spindle or other driving or actuating part of a machine. In this connection it will be observed that the adapter 10 is provided with an annular series of screw-receiving holes 12 which receive fastening screws (not shown) for detachably connecting the same to the spindle. As perhaps best shown in Fig. 2, each of the holes 12 has a reduced portion 14 at the rearward side 16 of the adapter through which the shank portions of the fastening screws extend and enlarged portions 18 at the forward side 20 of the adapter which receive the enlarged heads of the fastening screws.

A generally disk-shaped backplate 22 seats on the forward face of the adapter 10, and it will be observed that the backplate is slightly smaller in diameter than the adapter. Although this particular relationship is not essential, the backplate 22 preferably is sufficiently large to cover the screw holes 12 so as to retain the fastening screws and to limit the extent to which the screws can loosen in use. A forwardly extending annular flange 24 on the periphery of the adapter 10 surrounds the backplate 22, and radially disposed set screws 26 carried by the flange engage the periphery of the backplate 22 at circumferentially spaced points to hold the latter exactly concentric with respect to the rotational axis of the chuck. It will be observed, in this connection, that the internal diameter of the flange 24 is larger than the diameter of the backplate 22 so that the latter can be adjusted radially to assure exact centering thereof. After the backplate 22 has been properly centered it is held securely in this position by the set screws 26. An annular series of screws 28 fasten the backplate 22 securely to the adapter 10, and these screws preferably are staggered with respect to the screw holes 12 so that there is no possibility of interference between the screws which fasten the adapter 10 to the spindle and the screws 28 which fasten the backplate 22 to the adapter.

The forward face of the backplate 22 is formed with a rearwardly offset peripheral annular surface 30 defining a radial shoulder 32, and a cylindrical ring 34 fitting snugly around the shoulder 32 and against the radial face 30 is fastened to the backplate by an annular series of screws 36. Similarly, the forward face of the backplate 22 is formed with a central depression or socket 38 which snugly receives a cylindrical plug or hub 40. It will be observed that the hub 40 extends forwardly from the backplate 22 in the same direction but to a lesser extent than the ring 34 and it is fastened securely to the backplate by screws 42. Preferably, the screws 42 are countersunk so that the heads thereof do not project beyond the back surface of the plate.

Surmounting the hub 40 is a flexible and resilient diaphragm 44 having a relatively large, massive, central portion 46 provided in the rearward face thereof with a central socket 48 which receives and snugly fits the outer end portion of the hub 40. The enlarged central portion 46 of the diaphragm is sufficiently large to make such central portion essentially strong and rigid and to provide a proper mounting for fastening screws 50 which extend rearwardly therethrough into the hub and backplate to hold the parts securely together. The periphery 52 of the diaphragm 44 is disposed in proximity to but spaced slightly from the inner annular surface of the ring 34, and a seal 54 set into the periphery of the diaphragm engages the ring to close the space entirely around the diaphragm. The sealing engagement thus effected between the diaphragm and the ring 34 provides a closed, fluidtight cylinder behind the diaphragm.

A piston 56 is mounted for reciprocation in the fluidtight cylinder hereinabove referred to, and it is of course necessary that the piston be annular in form so that it will fit in the ring 34 and around the central hub 46. A sealing ring 58 carried by the piston 56 at the inner edge thereof seals the space between the inner edge of the piston and the adjacent outer cylindrical surface of the hub 40. Similarly, an annular sealing ring 60 recessed into the outer peripheral edge of the piston 56 engages the inner cylindrical surface of the ring 34 to seal the space therebetween.

Fluid under pressure such as air, for example, is admitted into the cylinder behind the piston 56 through a hole 62 in the backplate 22 and hub 40 and a radial passage 64 in the hub. The hole 62 here shown is internally threaded to receive the union of an air pipe (not shown) or the like according to conventional practice. Air from any suitable source is supplied to the hole 64 and thence passes into the cylinder behind the piston to advance the latter in the direction of the diaphragm 44.

An annular spacer 66 interposed between the outer marginal portions of the diaphragm 44 and piston 56 assures that forward pressure of the piston is locally applied against the outer marginal portion only of the diaphragm 44 so that forward movement of the piston acts through the spacer to flex the peripheral portion of the diaphragm 44 outwardly. When the piston is advanced by air or other fluid under pressure in the cylinder behind the piston, such pressure is applied to the diaphragm 44 through the spacer ring 66 causing the diaphragm to flex outwardly to a point where the return action of the diaphragm is equal to the forward thrust pressure of the piston. In this connection of course the diaphragm and the piston are in static balance. Conversely, when air pressure to the back of the piston 56 is shut off, pressure against the piston is released and the inherently flexible nature of the diaphragm 44 causes the same to spring back and to its initial radial position.

An annular series of work-clamping jaws 68 is provided on the outer face of the diaphragm 44. The particular construction and mounting of these jaws may vary considerably within the scope of this invention. It is intended that the jaws be constructed in accordance with the nature of the work to be clamped by the chuck, and considerable variation in the size and shape of the jaws therefore will necessarily occur in use. Further, it is contemplated that the jaw assemblies be either affixed or adjustably mounted on the diaphragm. Our prior Patents Nos. 2,464,507, 2,491,611, 2,565,430, and 2,568,585 all show various types of jaw mountings that can be used on or adapted for use with a chuck of the type here shown. The jaws 68 here shown have outer work-clamping faces 70 adapted to engage the cylindrical wall of a hole 72 in a workpiece 74. However, it will be readily appreciated that it may be necessary on occasions to clamp a workpiece internally by surfaces which are not cylindrical; for example, it is contemplated that the chuck may be adapted for chucking an internal gear or the like. For this purpose the jaws may be provided with gear pins of the type shown in certain of our prior patents referred to specifically above.

In view of the foregoing it will be readily apparent that the particular jaw assemblies here shown are representative only. The jaws are shown only to illustrate an operative clamping structure on the diaphragm and it is not intended that the invention be limited in any way to the particular jaw structure shown. Six jaws 68 are here shown arranged concentrically and in equispaced relation around the axis of the chuck, and since all the jaws are identical in construction and operation a detailed description of one will suffice.

Each of the jaws 68 comprises a base portion 76 which is fastened securely in any suitable manner to the flexible and resilient portion of the diaphragm 44. An outward extension 78 on the jaw base has a bore 80 arranged radially with respect to the axis of the chuck, and the shank portion 82 of a work-engaging jaw element 84 is received within the bore. As perhaps best shown in Fig. 2, the jaw element 84 is disposed at the outer side of the extension 78 and the outer face of this element defines the work-clamping surface 70 hereinabove referred to. An adjustable set screw 86 carried by the extensions 78 behind the shank 82 positions the jaw element 84 radially for proper engagement with the work 74. Set screws 88 and 90 also carried by the extension 78 act through soft metal plugs 92 and 94 respectively to hold the set screw 86 and the shank 82 securely in selected adjusted positions.

Figure 2:
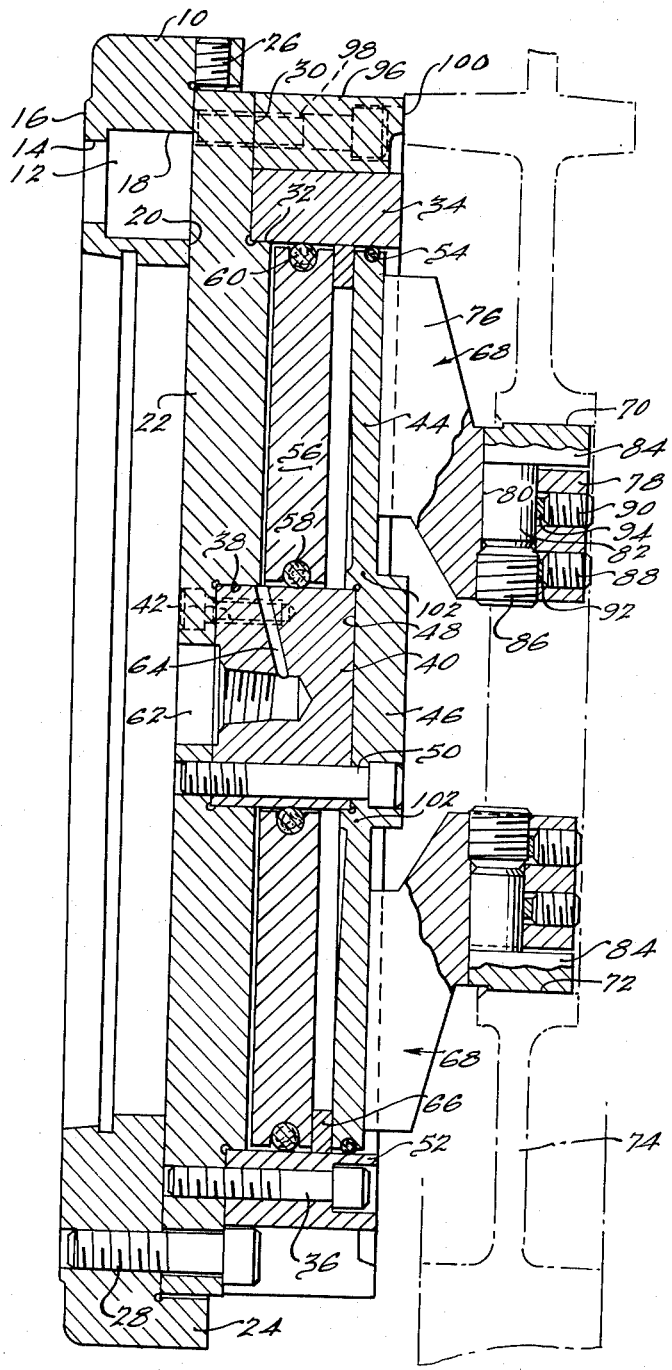
Fig. 2 is a sectional view taken on the line 2—2 of Fig. 1.

Segmental stop plates 96 fastened on the backplate 22 outside the ring 34 by screws 98 have forward surfaces 100 positioned to engage the workpiece 74 when the workpiece is clamped by the jaws 68, as shown in Fig. 2, to support the workpiece radially outwardly of the jaws and to position the same precisely axially on the chuck.

In use, air or other suitable fluid under pressure is admitted into the space behind the piston 56 to advance the same forcibly against the spacer 66 so as to flex the peripheral portion of the diaphragm 44 outwardly. This action causes the diaphragm 44 to flex about an annular locus of points designated generally at 102 and disposed approximately at the juncture of the flexible outer portion of the diaphragm and the rigid central portion 46 thereof. As the diaphragm 44 flexes outwardly in the manner described, the jaws 68 converge slightly. Manifestly, a converging motion of the jaw assemblies 68 reduces the diametrical dimension between the work-engaging surfaces 70 of opposed jaw elements 84. Thus, as the diaphragm flexes forwardly or outwardly the jaw assemblies 68 move to a work-releasing and -receiving position. In other words, when the diaphragm is flexed outwardly they release the workpiece 74 so that the latter can then be easily removed. Also, when the diaphragm is flexed in this manner another workpiece can be readily slipped onto the jaws. Thereafter, pressure behind the piston 56 is released. When this occurs, the piston releases the diaphragm 44 and the inherently resilient nature of the diaphragm causes it to flex rearwardly and to assume its initial shape and position. As the diaphragm 44 returns to its original position, the jaw assemblies 68 swing rearwardly and outwardly about theoretical points 102 to engage and clamp the workpiece 74. Furthermore, as the jaws engage the workpiece 74 they simultaneously operate to pull the same backwardly against the stops 100 so that the latter solidly engage the workpiece to support the same radially outwardly of the jaws 68 and to position the same precisely axially on the chuck. Thus, the jaws 68 and the stops 100 jointly co-operate in supporting the workpiece. The joint holding and locating action thus afforded by the jaw 68 and stop 100 is important in many types of checking and machining operations performed on workpieces while chucked in the manner shown.

It is a feature of this invention that the entire diaphragm assembly can be removed easily and quickly from the chuck simply by unscrewing the screws 50. It is much simpler and quicker in most instances to remove the entire diaphragm assembly rather than the jaws 68. When the jaws are removed from the diaphragm they must be reset and adjusted each time they are replaced. However, if the diaphragm and the jaws are removed as an assembly, they can be easily and quickly replaced as a unit without necessity of making additional adjustment to the individual jaws. This is a decided advantage in situations where frequent changes must be made in the size and form of the jaws in order to adapt the chuck to different sizes and types of workpieces. Many situations occur in actual use where the chuck must be adapted frequently to different workpieces in order to secure maximum efficiency of operation in use. Manifestly, the instant construction is admirably suited for this purpose.

Having thus described the invention, we claim:

1. An internal diaphragm chuck comprising a backplate, an annular wall mounted on and extending from said backplate, a central hub also mounted on said backplate and extending therefrom in the same direction as said annular wall, a flexible and resilient diaphragm fastened centrally to said hub projecting radially therefrom with the periphery thereof in proximity but spaced from said annular wall, means sealing the annular space between said diaphragm and said wall, an annular piston interposed between said back plate and said diaphragm, sealing means between and engaging the periphery of said piston and said annular wall, sealing means between and engaging the inner edge of said piston and said hub, an annular spacer between the periphery of said piston and the peirphery of said diaphragm, means for admitting fluid under pressure behind said piston for advancing the same against said spacer to flex the periphery of the diaphragm outwardly, work-carrying jaws on said diaphragm movable into a work-releasing and -receiving position by flexure of said diaphragm, and stop means on said annular wall engageable by the work when pressure against said diaphragm is released, said stop means supporting the work radially outwardly of the jaws and locating the same axially on the chuck.

2. The combination as set forth in claim 1 wherein said diaphragm is formed with a relatively massive and rigid central portion which overlies said central hub, and including means detachably fastening the central portion of the diaphragm to said hub.

3. The combination as set forth in claim 1 wherein said diaphragm has an essentially rigid central portion provided with a recess in the rearward face thereof receiving and snugly fitting said hub, and including screw elements detachably fastening the central portion of the diaphragm to said hub and permitting ready replacement of the body and diaphragm assembly.

4. An internal diaphragm chuck comprising a backplate, an annular wall mounted on and extending from said backplate, a central hub also mounted on said backplate and extending therefrom in concentric relation with respect to said annular wall, a flexible and resilient diaphragm fastened centrally to said hub projecting radially therefrom with the periphery thereof in proximity but spaced from said annular wall, sealing means carried by said diaphragm engaging said annular wall to provide a closed cylinder behind the diaphragm while at the same time permitting the periphery of the diaphragm to flex relative to said wall, a piston mounted for reciprocation in said cylinder, means interconnecting the peripheries of said piston and said diaphragm, means for forcibly actuating said piston in the direction of said diaphragm to flex the periphery of the latter outwardly, work-carrying jaws on said diaphragm movable to a work-releasing and -receiving position by flexure of said diaphragm, and stop means on said annular wall engageable by the work when pressure against said diaphragm is released, said stop means supporting the work radially outwardly of the jaws and locating the same axially on the chuck.

5. An internal diaphragm chuck comprising an open-ended cylinder, a flexible and resilient diaphragm mounted in the open end of said cylinder, means fixedly holding the center portion only of said diaphragm, means sealing the space between the periphery of the diaphragm and said cylinder, means for flexing the peripheral portion of said diaphragm including a piston mounted for reciprocation in the cylinder, and means interconnecting the peripheral portions of said piston and said diaphragm, means for forcibly advancing said piston in the cylinder to flex the periphery of said diaphragm outwardly, work-carrying jaws on said diaphragm movable to a work-releasing and -receiving position by outward flexure of said diaphragm, and stop means on said cylinder engageable by the work when pressure against said diaphragm is released, said stop means supporting the work radially outwardly of the jaws and locating the same axially on the chuck.

6. An internal diaphragm chuck comprising an open-ended cylinder; a flexible and resilient diaphragm mounted in the open end of said cylinder; means engaging and supporting the central portion only of said diaphragm; means detachably fastening the central portion of the diaphragm to said supporting means; means sealing the space between the periphery of the diaphragm and said cylinder; a piston mounted for reciprocation in the cylinder behind said diaphragm; means interconnecting the peripheral portions of said piston and said diaphragm; means for forcibly advancing said piston in the cylinder to flex the periphery of said diaphragm outwardly; work-carrying jaws on said diaphragm movable to a work-releasing and -receiving position by outward flexure of said diaphragm; and stop means on said cylinder engageable by the work when pressure against said diaphragm is released, said stop means supporting the work radially outwardly of the jaws and locating the same axially on the chuck.

7. An internal diaphragm chuck comprising a flexible and resilient diaphragm, means supporting the central portion only of said diaphragm, means engaging the diaphragm radially outwardly of said central support for flexing the peripheral portion thereof, work-carrying jaws on said diaphragm movable to a work-releasing and -receiving position by flexure of said diaphragm in one direction, and stationary stop means engageable by the work when the diaphragm flexes in the opposite direction operative to support the work radially outwardly of the jaws and to locate the same axially on said chuck.

8. In an internal diaphragm chuck, a flexible and resilient diaphragm having a central mounting portion, means for flexing the peripheral portion of said diaphragm relative to said central mounting portion, work-carrying jaws on said diaphragm movable to a work-releasing and -receiving position by flexure of said diaphragm in one direction, and stop means engageable by said work upon flexure of said diaphragm in the opposite direction operative for supporting the work radially outwardly of the jaws and for locating the same axially on said chuck.

References Cited in the file of this patent

UNITED STATES PATENTS

| | | |
|---|---|---|
| 2,462,501 | Hohwart et al. | Feb. 22, 1949 |
| 2,464,507 | Hohwart et al. | Mar. 15, 1949 |
| 2,491,611 | Hohwart et al. | Dec. 20, 1949 |
| 2,492,640 | Hohwart et al. | Dec. 27, 1949 |
| 2,565,430 | Hohwart et al. | Aug. 21, 1951 |
| 2,568,585 | Hohwart et al. | Sept. 18, 1951 |